United States Patent
Bharatia et al.

(10) Patent No.: US 12,267,905 B2
(45) Date of Patent: Apr. 1, 2025

(54) SYSTEMS AND METHODS FOR VIRTUALIZED SESSION MANAGEMENT

(71) Applicant: Verizon Patent and Licensing Inc., Basking Ridge, NJ (US)

(72) Inventors: Jayshree A. Bharatia, Plano, TX (US); Amir Saghir, Frisco, TX (US); Ali Imdad Malik, East Brunswick, NJ (US); Jerry Steben, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 360 days.

(21) Appl. No.: 17/809,215

(22) Filed: Jun. 27, 2022

(65) Prior Publication Data
US 2023/0422338 A1    Dec. 28, 2023

(51) Int. Cl.
*H04W 76/25* (2018.01)
*H04W 76/10* (2018.01)
*H04W 80/10* (2009.01)

(52) U.S. Cl.
CPC ........... *H04W 76/25* (2018.02); *H04W 76/10* (2018.02); *H04W 80/10* (2013.01)

(58) Field of Classification Search
CPC ...... H04W 80/10; H04W 76/10; H04W 76/25
USPC ......................................................... 370/328
See application file for complete search history.

(56) References Cited

U.S. PATENT DOCUMENTS

| | | | |
|---|---|---|---|
| 2013/0176897 A1* | 7/2013 | Wang ................... | H04W 88/08 370/254 |
| 2020/0107253 A1* | 4/2020 | Albasheir ........... | H04L 43/0852 |
| 2022/0408353 A1* | 12/2022 | Hegde ............... | H04W 28/0284 |

OTHER PUBLICATIONS

Cheng, Shang-Wen, et al., An Architecture for Coordinating Multiple Self-Management Systems, Mar. 8, 2004 (Year: 2004).*

* cited by examiner

*Primary Examiner* — Peter G Solinsky (57) ABSTRACT

A device may include a processor configured to maintain a plurality of session management entities (SMEs) for a core network associated with a radio access network (RAN). The processor may be further configured to establish a communication session using a first SME, of the plurality of SMEs; store session data for the communication session in a communication session database accessible by each of the plurality of SMEs; receive, using a second SME of the plurality of SMEs, a message associated with the communication session; retrieve, using the second SME, session data for the communication session from the communication session database, based on receiving the message; and process, using the second SME, the message using the retrieved session data.

20 Claims, 8 Drawing Sheets

SYSTEMS AND METHODS FOR VIRTUALIZED SESSION MANAGEMENT

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. For example, a wireless access network may need to manage a large number of communication sessions. Maintaining a large number of communication sessions may pose various challenges.

DETAILED DESCRIPTION OF EMBODIMENTS

The following detailed description refers to the accompanying drawings. The same reference numbers in different drawings identify the same or similar elements.

Wireless network, such as Fourth Generation (4G) wireless networks, Fifth Generation (5G) wireless networks, and/or other types of wireless networks, continue to add new users and manage an increasing number of communication sessions. A communication session, associated with a user equipment (UE) device attached to a 4G or 5G core network via a Radio Access Network (RAN), may provide Internet Protocol (IP) and/or other kind of connectivity between the UE device and an application server in a network, another UE device, and/or another type of device. Each communication session may be handled by a Session Management Entity (SME) in the core network. As an example, in a 5G network, an SME may include a Session Management Function (SMF). As another example, in a 4G network, an SME may include a Packet Data Network Gateway Control Function (PGW-C). The SME may maintain session data for each communication session.

SMEs, and/or other network functions (NFs) in a core network, may be virtualized. Virtualized network function (VNF) representations of network devices and/or nodes may be implemented using, for example, a European Telecommunications Standards Institute (ETSI) network function virtualization (NFV) management and organization (MANO) architecture and may be referred to as VNF managed objects (VNF MOs). In contrast to specialized hardware, which may be costly, time-consuming to deploy, difficult to scale, and/or labor-intensive to manage, NFV may enable network entities to be implemented on standardized hardware, resulting in lower deployment and/or maintenance costs, as well as bring greater flexibility compared to dedicated hardware implementations. For example, a VNF may be implemented on a hardware component that is part of a common shared physical infrastructure used to implement VNF instances using Software Defined Networking (SDN) or another type of virtualization technique. For example, an SDN controller may implement one or more of the SMEs using an adapter implementing a VNF virtual machine, a Cloud Native Function (CNF) container, an event driven serverless architecture interface, and/or another type of SDN component. The common shared physical infrastructure may be implemented using computer devices in a cloud computing center, a multi-access edge computing (MEC) system associated with a base station, and/or in another type of computer system.

Virtualized SMEs may enable easy scaling and deployment of additional SMEs to handle an increased load and/or to provide redundancy and robustness. For example, a set of SMEs may be deployed in a device or group of devices to serve UE devices in a particular geographic area, a particular RAN, etc. When an SME in the SME set fails, sessions managed by the failed SME may be transferred over to another SME in the set. However, the transfer of a communication session from one SME to another SME may cause a number of messages to be exchanged in the core network.

For example, if a first PGW handling a communication session fails, a Policy and Charging Rules Function (PCRF) may select a second PGW to handle the communication session as a result of the failure. In response, the second PGW may need to send an update bearer request to a Mobility Management Entity (MME), via a Serving Gateway (SGW), and the MME may need to respond with an update bearer response, via the SGW. Then, the MME may need to send a create session request to the second PGW, via the SGW, and the second PGW may respond with a create session response, via the SGW, after a new session has been created. Furthermore, the MME may need to notify the Home Subscriber Server (HSS) of the new PGW for the session. Thus, the re-establishment of the session may result in multiple messages being sent in the core network, resulting in inefficient use of the processor, memory, and network bandwidth resources of the core network.

Implementations described herein relate to virtualized session management that enables a set of SMEs to share a session database that stores session data and in which any active SME from the set of SMEs may process messages for any communication session for which session data is stored in the session database. NFs are kept agnostic with respect to which particular SME from the set of SMEs is handling a communication session. In other words, the NFs remain unaware that a different SME is managing a session, in that they do not receive an indication or message relating to a second SME handling a message associated with a communication session established by a first SME.

Each SME may be part of an SME set. As an example, in a 4G core network, particular PGW-Cs may be part of a PGW-C set. As another example, in a 5G core network, particular SMFs may be part of an SMF set. The set of SMEs may be associated with a domain name. Other NFs and/or communication endpoints such as a UE device or application server, may use the domain name as a destination address rather than an address associated with a particular SME of the SME set. Thus, a communication endpoint associated with the session, or another NF that may need to communicate with the SME, may not receive an indication that a particular SME is handling a communication session and no messages within the core network may need to be sent between a second SME and another NF. In other words, there is no need to transfer or re-establish the communication session if a first SME, which established the communication session, happens to fail or otherwise become unavailable.

The ability of any SME from the SME set to handle a communication session established by any other SME from the SME set may be implemented by maintaining a session database that stores session data for SMEs in an SME set. In some implementations, the session database may be maintained locally by the SME set. Additionally, or alternatively, a session database may be maintained by a new NF, referred to as an Unstructured Data Storage Function (UDSF) that maintains a global session data database in a core network for multiple SME sets. Thus, the SMEs may be stateless with respect to session data for a particular communication session. In other words, the SMEs may not store any state information for the particular communication session.

For example, a device may maintain a set of SMEs for a core network associated with a RAN, establish a communication with a first SME from the set of SMEs, and store session data for the communication session in a communication session database accessible by each of the SMEs in the SME set. The device may further be configured to receive, by a second SME from the set of SMEs, a message associated with the communication session, retrieve, by the second SME, session data for the communication session from the communication session database, based on receiving the message, and process, by the second SME, the message using the retrieved session data.

The SMEs in an SME set may be load balanced. For example, the device may select the second SME based on communication session loads associated with particular ones of the plurality of SMEs. Furthermore, maintaining stateless SMEs with a separate session database may enable the device to update a configuration of an SME in the SME set without interrupting an active communication session associated with the SME. Moreover, additional SMEs may be added to the SME set without interrupting active communication sessions associated with SMEs in the SME set.

Figure 1:
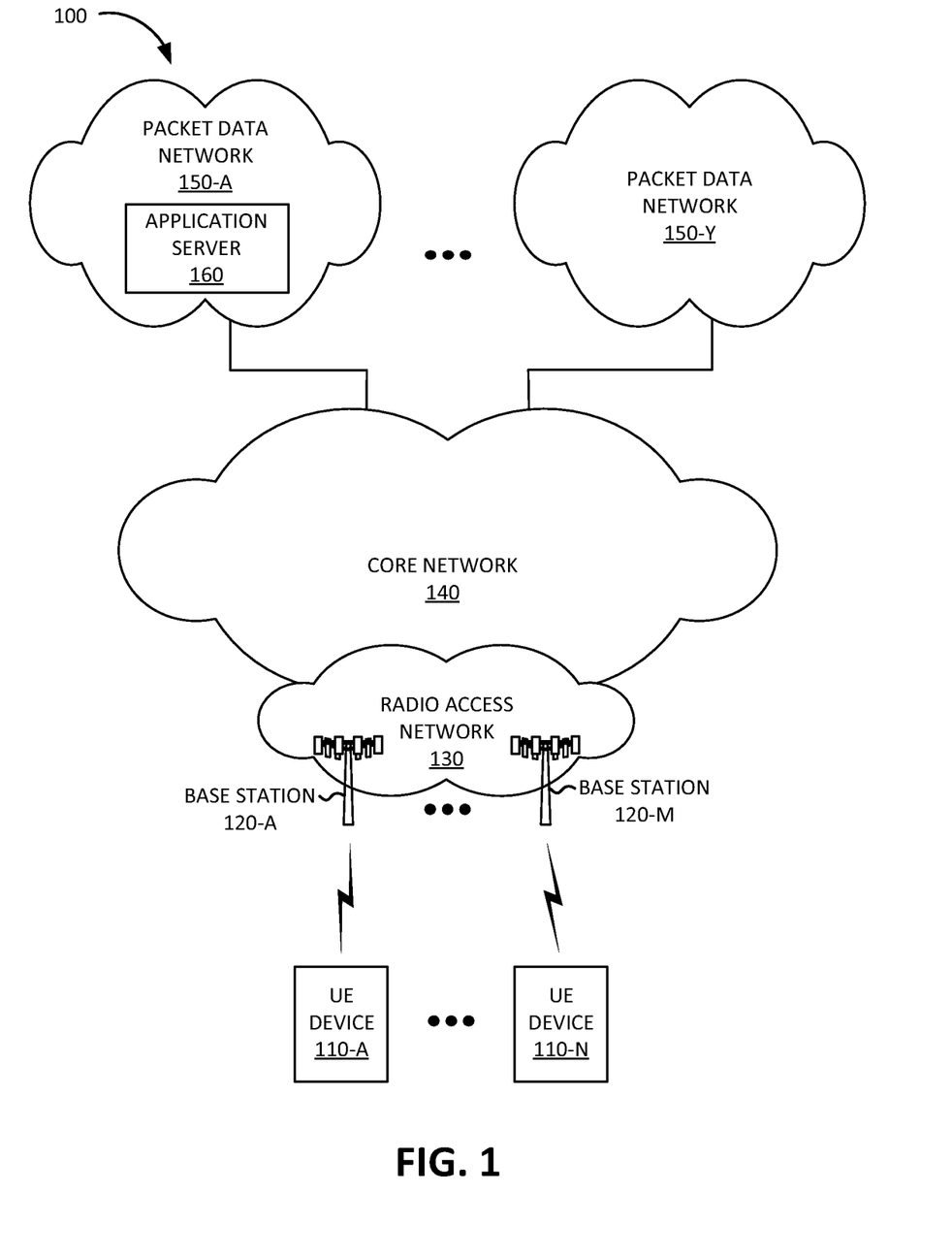
FIG. 1 illustrates an environment according to an implementation described herein.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, core network 140, and packet data networks (PDNs) 150-A to 150-Y (referred to herein collectively as "PDNs 150" and individually as "PDN 150").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 130 may include base stations 120. Base station 120 may enable UE device 110 to communicate with core network 140. Base station 120 may be configured for one or more Radio Access Technology (RAT) types. For example, base station 120 may include a 5G New Radio (NR) base station (e.g., a gNodeB) and/or a 4G Long Term Evolution (LTE) base station (e.g., an eNodeB). Each base station 120 may include devices and/or components configured to enable cellular wireless communication with UE devices 110. For example, base station 120 may cover a set of base station cells, also referred to as base station sectors. That is, each cell may cover a sector (e.g., a 120° sector, etc.) and include a radio frequency (RF) transceiver configured to send and receive wireless signals in the direction of the sector and be configured to communicate with UE devices 110 using a 5G NR air interface, a 4G LTE air interface, and/or using another type of cellular air interface.

Core network 140 may be managed by a provider of cellular wireless communication services and may manage communication sessions of subscribers connecting to core network 140 via RAN 130. For example, core network 140 may establish an Internet Protocol (IP) connection between UE devices 110 and PDN 150. In some implementations, core network 140 may include a 5G core network. In other implementations, core network 140 may include a 4G core network (e.g., an evolved packet core (EPC) network).

The components of core network 140 may be implemented as dedicated hardware components or as virtualized functions implemented on top of a common shared physical infrastructure using SDN. For example, an SDN controller may implement one or more of the components of core network 140 using an adapter implementing a VNF virtual machine, a CNF container, an event driven serverless architecture interface, and/or another type of SDN component. The common shared physical infrastructure may be implemented using one or more devices 400 described below with reference to FIG. 4 in a cloud computing center associated with core network 140. Exemplary components of core network 140 are described below with reference to FIGS. 2 and 3.

PDNs 150-A to 150-Y may each include a PDN. A particular PDN 150 may be associated with a Data Network Name (DNN) in 5G, and/or an Access Point Name (APN) in 4G, and a UE device may request a connection to PDN 150 using the DNN or APN. PDN 150 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. PDN 150 may include an application server 160 (shown in PDN 150-A in FIG. 1). Application server 160 may provide services for an application running on UE device 110 and may establish an application session with UE device 110 via an SME in core network 140.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
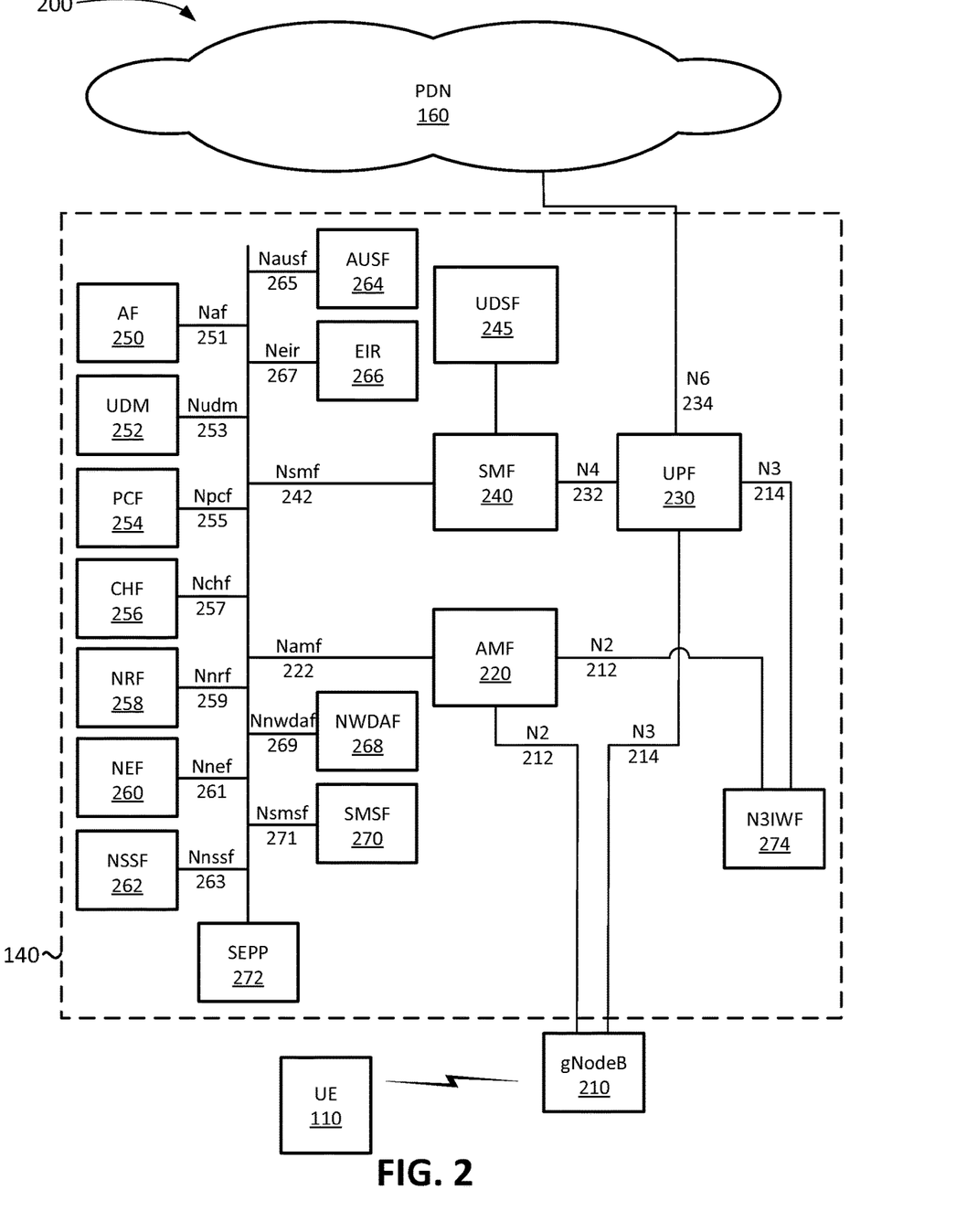
FIG. 2 illustrates exemplary components of a Fifth Generation (5G) core network according to an implementation described herein.

FIG. 2 illustrates a system 200 that includes exemplary components of core network 140 in the context of environment 100 according to an implementation described herein in which core network 140 includes a 5G core network. As shown in FIG. 2, system 200 may include UE device 110, gNodeB 210, core network 140, and PDN 160.

gNodeB 210 (corresponding to base station 120) may include devices (e.g., base stations) and components that enable UE device 110 to connect to core network 140 via RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 150 may include an Access and Mobility Function (AMF) 220, a User Plane Function (UPF) 230, an SMF 240, a UDSF 245, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, UDSF 245, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 140 may include multiple AMFs 220, UPFs 230, SMFs 240, UDSFs 245, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, transport of session management messages between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data. SMF 240 may be accessible via an Nsmf interface 242.

SMF 240 may be part of a set of SMEs that includes multiple SMFs 240 addressable via a single domain name. The SMFs 240 may be stateless with respect to session data for a particular communication session and session data for sessions managed by the SMFs 240 may be stored in a session database shared by the SMFs 240. In some implementations, the session database may be maintained locally by a device that manages the set of SMFs 240. In other implementations, the session database may be maintained by UDSF 245 as a separate NF through which SMF 240 communicates via a 5G network interface. UDSF 245 may store session data for SMFs 240 in core network 140 and any SMF 240 from a set of SMFs 240 may process a message associated with a communication session established by any other SMF 240 in the set of SMFs 240 by accessing session data for the communication session from UDSF 245.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 140. For example, CHF 256 may generate a charging record for UE device 110 based on data flow information associated with UE device 110. CHF 256 may be accessible via Nchf interface 257.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including 3$^{rd}$ party NFs, AFs, edge computing NFs, and/or other types of NFs. Furthermore, NEF 260 may secure provisioning of information from external applications to core network 140, translate information between core network 140 and devices/networks external to core network 140, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 120 and/or core network 140. For example, NWDAF 268 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between RAN 130 and the non-3GPP access device. N3IWF 274 maybe accessible via Nn3iwf interface 275.

Although FIG. 2 shows exemplary components of core network 140, in other implementations, core network 140 may include fewer components, different components, differently arranged components, or additional components than depicted in FIG. 2. Additionally, or alternatively, one or more components of core network 140 may perform functions described as being performed by one or more other components of core network 140. For example, core network 140 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 140 may include a reference point architecture that includes point-to-point interfaces between particular function nodes.

Figure 3:
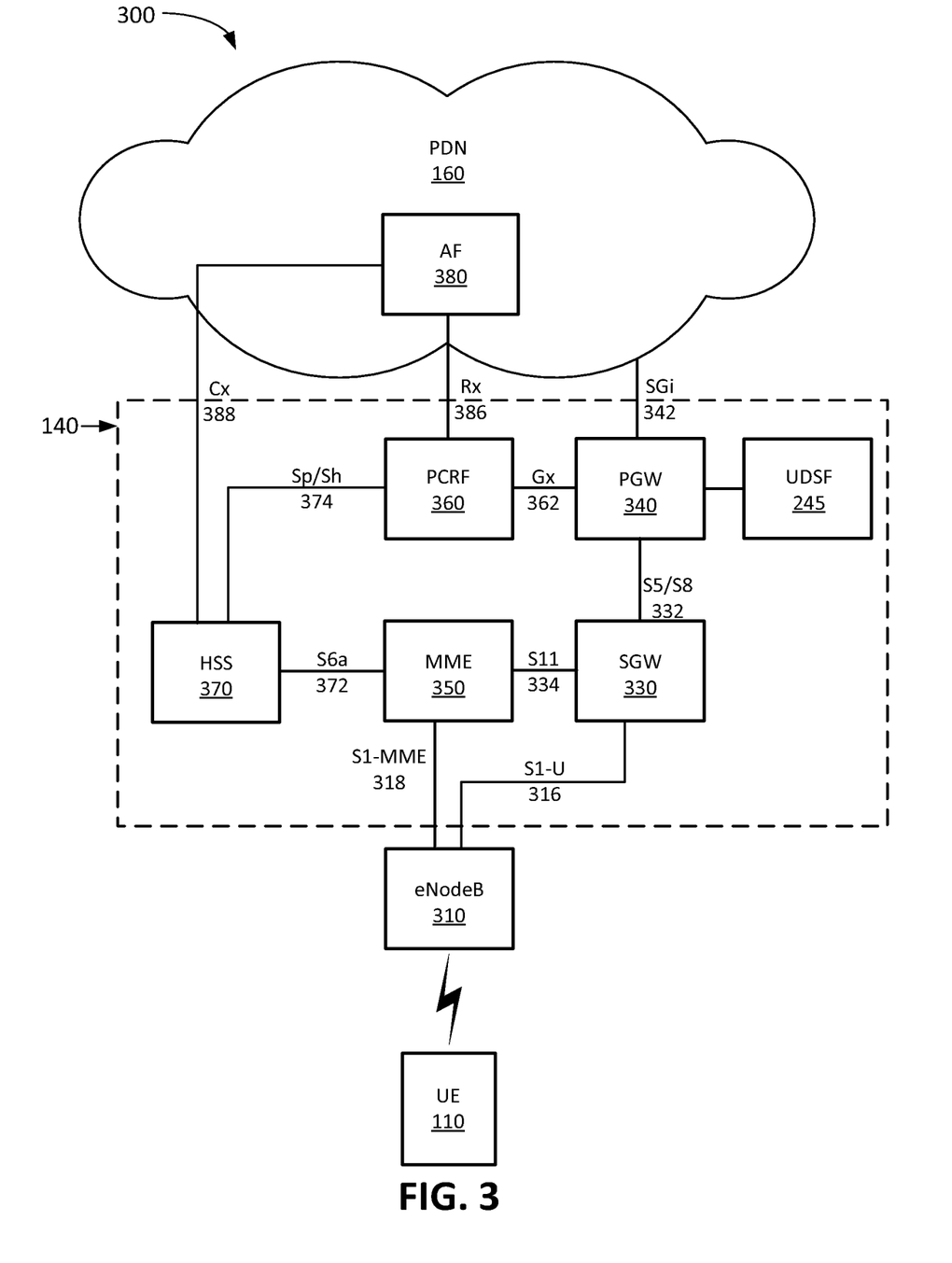
FIG. 3 illustrates exemplary components of a Fourth Generation (4G) core network according to an implementation described herein.

FIG. 3 illustrates a system 300 that includes exemplary components of core network 140 that includes a 4G LTE core network according to an implementation described herein. As shown in FIG. 3, system 300 may include UE device 110, eNodeB 310, core network 140, and PDN 160. eNodeB 310 may correspond to, or be included in, base station 120. eNodeB 310 may communicate with UE device 110 using a 4G LTE air interface referred to as an Evolved Universal Mobile Telecommunications System (UMTS) Terrestrial Radio Access Network (E-UTRA) interface 312.

As shown in FIG. 3, core network 140 may include a Serving Gateway (SGW) 330, a PGW 340, a UDSF 245, a Mobility Management Entity (MME) 350, a Policy and Charging Rules Function (PCRF) 360, and a Home Subscriber Server (HSS) 370. While FIG. 3 depicts a single eNodeB 310, a single SGW 330, a single PGW 340, a single UDSF 245, a single MME 350, a single PCRF 360, and a single HSS 370 for illustration purposes, in practice, system 300 may include multiple eNodeBs 310, multiple SGWs 330, multiple PGWs 340, multiple UDSFs 245, multiple MMEs 350, multiple PCRFs 360, and/or multiple HSSs 370.

eNodeB 310 may interface with core network 140 via an interface referred to as an S1 interface, which may include both a control plane S1-MME interface 318 and a data plane S1-U interface 316. S1-MME interface 318 may interface with MME 350. S1-MME interface 318 may be implemented, for example, with a protocol stack that includes a NAS protocol and/or Stream Control Transmission Protocol (SCTP). An S1-U interface 316 may interface with SGW 330 and may be implemented, for example, using General Packet Radio Service (GPRS) Tunneling Protocol version 2 (GTPv2).

SGW 330 may provide an access point to and from UE device 110, may handle forwarding of data packets for UE device 110, and may act as a local anchor point during handover procedures between different eNodeBs 310. SGW 330 may interface with PGW 340 through an S5/S8 interface 332. S5/S8 interface 332 may be implemented, for example, using GTPv2. PGW 340 may function as a gateway to IP network 301 through an SGi interface 342. A particular UE device 110, while connected to a single SGW 330, may be connected to multiple PGWs 340, one for each data network (e.g., PDN 160) with which UE device 110 communicates.

PGW 240 may include a PGW-C for managing control plane functions associated with communication sessions and a PGW User Plane Function (PGW-U) for managing the user plane associated with the communication sessions. A particular PGW-C may be part of a set of SMEs that includes multiple PGW-Cs addressable via a single domain name. The PGW-Cs may be stateless with respect to session data and session data for sessions managed by the PGW-Cs may be stored in a session database shared by the PGW-Cs. In some implementations, the session database may be maintained locally by a device that manages the set of PGW-Cs.

In other implementations, the session database may be maintained by UDSF 245 as a separate function or device through which PGW 340 communicates via a 4G network interface. UDSF 245 may store session data for PGW-Cs in core network 140 and any PGW-C from a set of PGW-Cs may process a message associated with a communication session established by any other PGW-C in the set of PGW-Cs by accessing session data for the communication session from UDSF 245.

MME 350 may implement control plane processing for core network 140. For example, MME 350 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular QoS requirements. MME 350 may also select a particular SGW 330 for a particular UE device 110.

MME 350 may communicate with SGW 330 through an S11 interface 334. S11 interface 334 may be implemented, for example, using GTPv2. S11 interface 334 may be used to create and manage a new session for a particular UE device 110. S11 interface 334 may be activated when MME 350 needs to communicate with SGW 330, such as when the particular UE device 110 attaches to core network 140, when bearers need to be added or modified for an existing session for the particular UE device 110, when a connection to a new PGW 340 needs to be created, or during a handover procedure (e.g., when the particular UE device 110 needs to switch to a different SGW 330).

PCRF 360 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 360 may communicate with PGW 340 through a Gx interface 362. Gx interface 362 may be implemented, for example, using Diameter protocol.

HSS 370 may store subscription information associated with UE devices 110 and/or information associated with users of UE devices 110. For example, HSS 370 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 370 may communicate with MME 350 through an S6a interface 372. S6a interface 372 may be implemented, for example, using a Diameter protocol. HSS 370 may communicate with PCRF device 360 using an Sp/Sh interface 374. AF 380 may provide an enterprise policy to PCRF 360. AF 380 may communicate with PCRF 360 through an Rx interface 386 and may communicate with HSS 350 through a Cx interface 388. Rx interface 386 and Cx interface 388 may be implemented, for example, using Diameter protocol.

Although FIG. 3 shows exemplary components of core network 140, in other implementations, core network 140 may include fewer components, different components, differently arranged components, or additional components than depicted in FIG. 3. Additionally, or alternatively, one or more components of core network 140 may perform functions described as being performed by one or more other components of core network 140.

Figure 4:
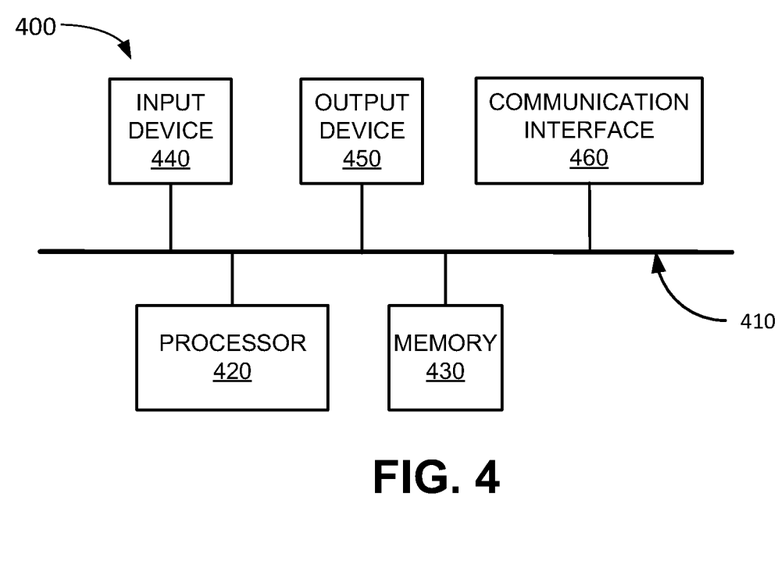
FIG. 4 is a diagram illustrating exemplary components of a device that may be included in a component of an environment according to an implementation described herein.

FIG. 4 illustrates example components of a device 400 according to an implementation described herein. UE device 110, application server 160, gNodeB 210, AMF 220, UPF 230, SMF 240, UDSF 245, AF 250, UDM 252, PCF 254, CHF 256, NRF 258, NEF 260, NSSF 262, AUSF 264, EIR 266, NWDAF 268, SMSF 270, SEPP 272, N3IWF 274, eNodeB 310, SGW 330, PGW 340, MME 350, PCRF device 360, HSS 370, AF 380, and/or other components of core network 140, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to virtualized session management for a set of stateless SMEs with a shared session database. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
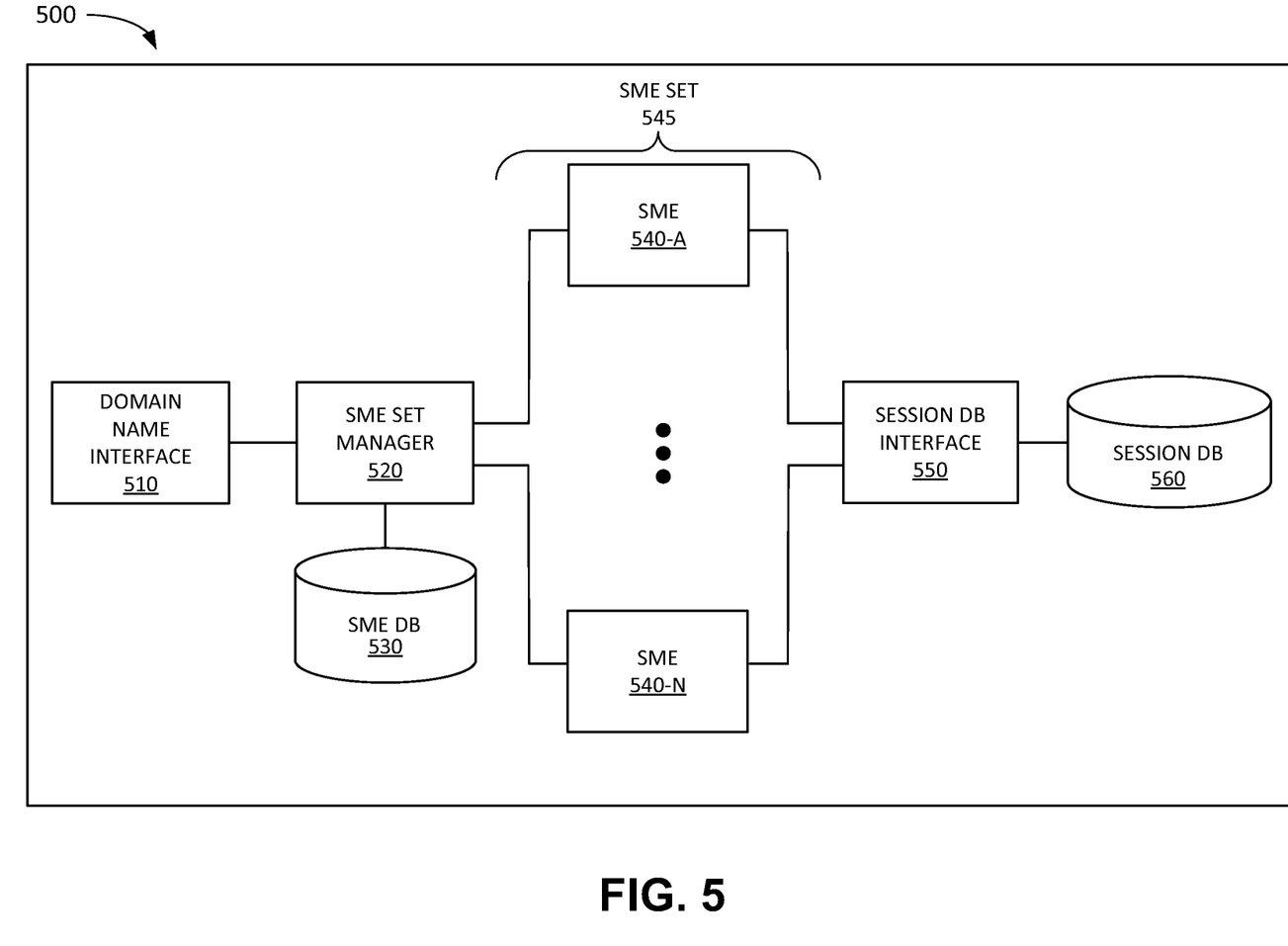
FIG. 5 is a diagram illustrating exemplary components of a device that includes a session management entities (SMEs) set according to an implementation described herein.

FIG. 5 is a diagram illustrating exemplary components of a device 500 that may be included in core network 140, such as, for example, SMF 240, PGW 340, and/or UDSF 245. The components of system 500 may be implemented, for example, via processor 420 executing instructions from memory 430. Alternatively, some or all of the components of system 500 may be implemented via hard-wired circuitry. Device 500 may maintain an SME set 540 of SMEs 540-A to 540-N. As shown in FIG. 5, device 500 may include a domain name interface 510, an SME set manager 520, an SME database (DB) 530, SME set 545 of SMEs 540-A to 540-N, a session DB interface 550, and a session DB 560.

Domain name interface 510 may provide an interface reachable via a domain name associated with SME set 545 by other NFs in core network 140 as well as by UE devices 110, base stations 120, and/or devices in PDNs 150, such as application server 160. Domain name interface 510 may implement one or more 5G and/or 4G core network interfaces as described above with reference to FIGS. 2 and 3. Domain name interface 510 may forward incoming messages to SME set manager 520 and may receive outgoing messages to be sent to other NFs and/or devices from SME set manager 520.

SME set manager 520 may distribute messages associated with communication sessions to particular SMEs in SME set 545. SME set manager 520 may select an SME to which to forward a message based on information stored in SME DB 530. SME DB 530 may store information identifying which SMEs in SME set 545 are active and/or available and forward the message to one of the active SMEs. Each SME 540 may implement an SME in core network 140. For example, in a 5G network, SME 540 may implement an SMF 240 and in a 4G network, SME 540 may implement a PGW-C of PGW 340. While SMEs 540 are shown as being implemented on a single device 500 in FIG. 5 for illustrative purposes, in practice, different SMEs 540 of SME set 545 may be implemented on different devices 500.

SME set manager 520 may select to which active SME of SME set 540 to forward a message based on the loads associated with SMEs 540-A to 540-N. As an example, SME set manager 520 may forward messages in a round-robin pattern forwarding each new communication session message to a next SME 540. As another example, SME set manager 520 may forward a communication session message to an SME 540 that is associated with the smallest number of currently active communication session messages. As yet another example, SME set manager 520 may forward a communication session to an SME 540 that is associated with a lowest total throughput within a time period, a lowest average latency within a time period, etc.

SME set manager 520 may monitor the status of SMEs 540-A to 540-N. As an example, SME set manager 520 may receive a status report message from particular SMEs 540 at particular intervals, indicating whether SME 540 is operational and/or experiencing any error states. As another example, SME set manager 520 may query SME 540-A to 540-N at particular intervals. If SME set manager 520 detects that SME 540 has failed or otherwise become unavailable, SME set manager 520 may designate the failed/unavailable SME 540 as inactive in SME DB 530.

SME 540 may be stateless with respect to session data. SME 540 may store session data for a communication session in session DB 560. When a first SME 540 fails and a second SME 540 has to process a message associated with a communication established by the first SME 540, the second SME 540 may retrieve session data for the communication session from session DB 560. SME 540 may communicate with session DB 560 via session DB interface 550. Since SMEs 540 are stateless with respect to session data, SME set manager 520 may update a configuration of SME 540, and/or add or delete SMEs 540 in SME set 545 (e.g., in response to a network management system sending an instruction to SME set manager 520), without disturbing or interrupting any active communication sessions being handled by SMEs 540.

In some implementations, session DB 560 may be maintained as a local DB by device 500 for SME set 545. In other implementations, session DB 560 may be included as a separate NF, namely UDSF 245, included on device 500 or included on another device remote from device 500. UDSF 245 may maintain session DB 560 for multiple SME sets 545 in core network 140. In yet other implementations, device 500 may maintain a local session DB 560 and may also copy the local session DB 560 to a global DB maintained by UDSF 245. Maintaining a global session DB by UDSF 245 for multiple SME sets 545 in core network 140 may enable processing of communication sessions between SME 540 in different SME sets 545. For example, if an entire SME set 545 fails, all communication session associated with the failed SME set 545 may continue to be managed SMEs 540 in another SME set 545 in core network 140 using information stored in UDSF 245.

Although FIG. 5 shows exemplary components of device 500, in other implementations, device 500 may include fewer components, different components, additional components, or differently arranged components than depicted in FIG. 5. Additionally, or alternatively, one or more components of device 500 may perform one or more tasks described as being performed by one or more other components of device 500.

Figure 6:
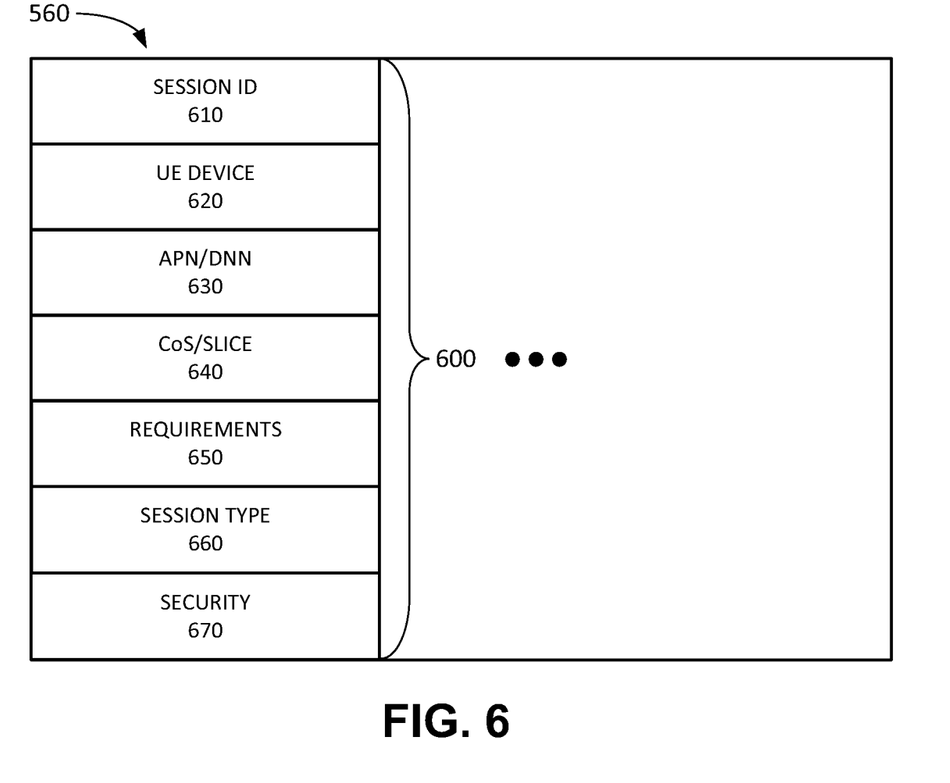
FIG. 6 is a diagram illustrating exemplary components of a session database according to an implementation described herein.

FIG. 6 illustrates exemplary components of session DB 560 according to an implementation described herein. As shown in FIG. 6, session DB 560 may include application records 600. Each session record 600 may store information relating to a particular communication session. Session record 600 may include a session ID field 610, a UE device field 620, an APN/DNN field 630, a Class of Service (CoS)/slice field 640, a requirements field 650, a session type field 660, and a security field 670.

Session ID field 610 may store a session ID associated with the particular communication session. UE device field 620 may store information identifying UE device 110 associated with the communication session. For example, UE device field 620 may store a Mobile Directory Number (MDN), an International Mobile Subscriber Identity (IMSI), a Mobile Station International Subscriber Directory Number (MSISDN), an International Mobile Equipment Identity (IMEI), a Globally Unique Temporary Identity (GUTI), a Cell Radio Network Temporary Identity (CRTNI), an IP address, a Media Access Control (MAC) address, and/or another type of identifier for UE device 110 associated with the communication session.

APN/DNN field 630 may store an APN or DNN associated with the communication session. CoS/slice field 640 may store information identifying a CoS and/or a network slice associated with the communication session. Requirements field 650 may store information identifying one or more requirements associated with the communication session, such as a guaranteed bit rate, a guaranteed latency, and/or another type of requirement. Session type field 660 may store information identifying a session type associated with the communication session, such as whether the communication session is an IP version 4 type, an IP version 6 type, an Ethernet type, an unstructured type, and/or another type of communication session. Security field 670 may store information identifying a security parameter associated with the communication session, such as a type of encryption associated with the communication session, a type of integrity protection associated with the communication session, and/or another type of security parameter associated with the communication session.

Although FIG. 6 shows exemplary components of session DB 560, in other implementations, session DB 560 may include fewer components, different components, additional components, or differently arranged components than depicted in FIG. 6.

Figure 7:
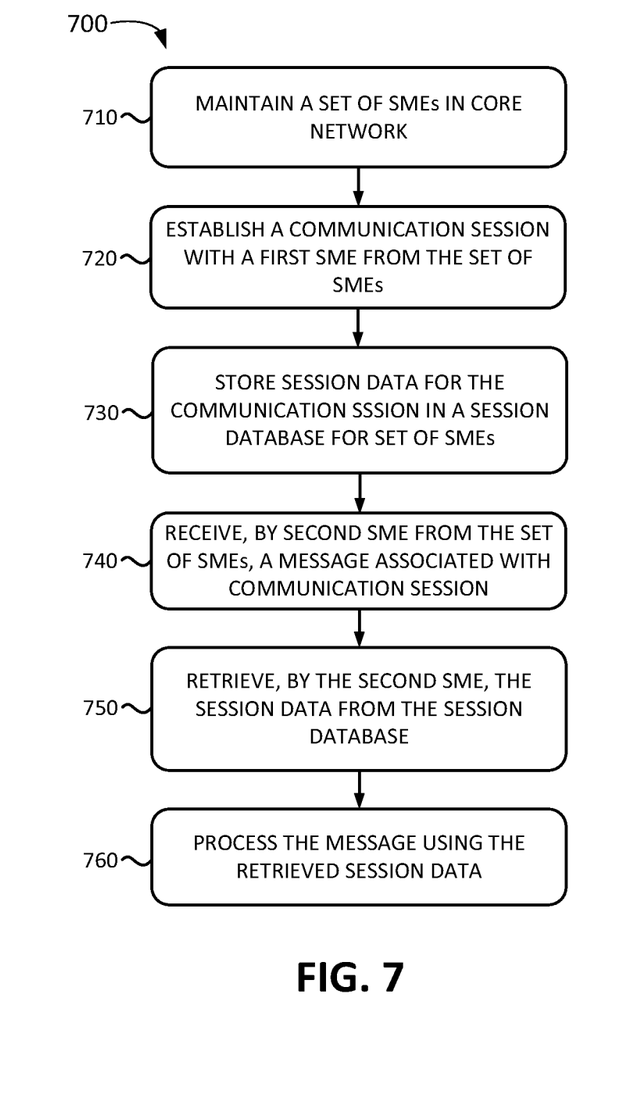
FIG. 7 illustrates a flowchart for virtualized session management according to an implementation described herein.

FIG. 7 illustrates a flowchart for virtualized session management according to an implementation described herein. In some implementations, process 700 of FIG. 7 may be performed by SMF 240, PGW 340, and/or UDSF 245. In other implementations, some or all of process 700 may be performed by another device or a group of devices.

As shown in FIG. 7, process 700 may include maintaining a set of SMEs in a core network (block 710). For example, SME set manager 520 may maintain SME set 545 in core network 140, such as a set of SMFs 240 in a 5G core network or a set of PGW-Cs of PGW 340 in a 4G network. Process 700 may further include establishing a communication session with a first SME from the set of SMEs (block 720) and storing session data for the communication session in a session DB for the set of SMEs (block 730). For example, UE device 110 may request a connection to a device in PDN 150 (e.g., application server 160, etc.) or to another UE device 110. In response, core network 140 may set up the connection using SME 540 of SME set 545. For example, AMF 220 may set up a PDU session with SMF 240 to manage a PDU session between UE device 110 and UPF 230 via gNodeB 210. As another example, MME 350 may set up a bearer between UE device 110 and PGW 340 via eNodeB 310. SME set manager 520 may select a particular SME 540 in SME set 545 for the session associated with the connection and SME 540 may store session data for the session in a local session DB 560 and/or in UDSF 245.

Process 700 may further include receiving, by a second SME from the set of SMEs, a message associated with the communication session (block 740), retrieving, by the second SME, the session data for the communication session from the session DB (block 750), and processing the message using the retrieved session data (block 760). For example, SME set manager 520 may receive message from another NF for the communication session, such as a message from AMF 220 to update context information for the communication session, a message from PCF 254 to apply a policy to the communication session, a message from NEF 260 to request context information for application server 160, a message from NWDAF 268 to collect one or more KPI metrics for the communication session, etc.

SME manager 520 may detect that the first SME 540 has failed or otherwise become unable to manage the communication session and may, in response, select a second SME 540 in SME set 545 (or in another SEM set 545) to which to forward the message for processing. Alternatively, SME manager 520 may select the second SME 540 in SME set 545 (or in another SEM set 545) regardless of whether the first SME 540 is active/available based on a round-robin selection process or another type of selection process to distribute message processing load among the SMEs 540 in SME set 545.

The second SME 540 may then use the session IDs for the communication session to retrieve session data for the communication session from the local session DB 560, or from UDSF 245, and process the received message using the retrieved session data. For example, the second SME 540 may update context information for the communication session in the local session DB 560, or in UDSF 245, may apply a policy to UPF 230 associated with the user plane for the communication session, instruct UPF 230 to collect data for the one or more KPI metrics, etc. Thus, the communication session may continue to be managed by SME set 545 without having to send control plane messages in core network 140 (other than messages exchanged with UDSF 245 to retrieve the session data).

Figure 8:
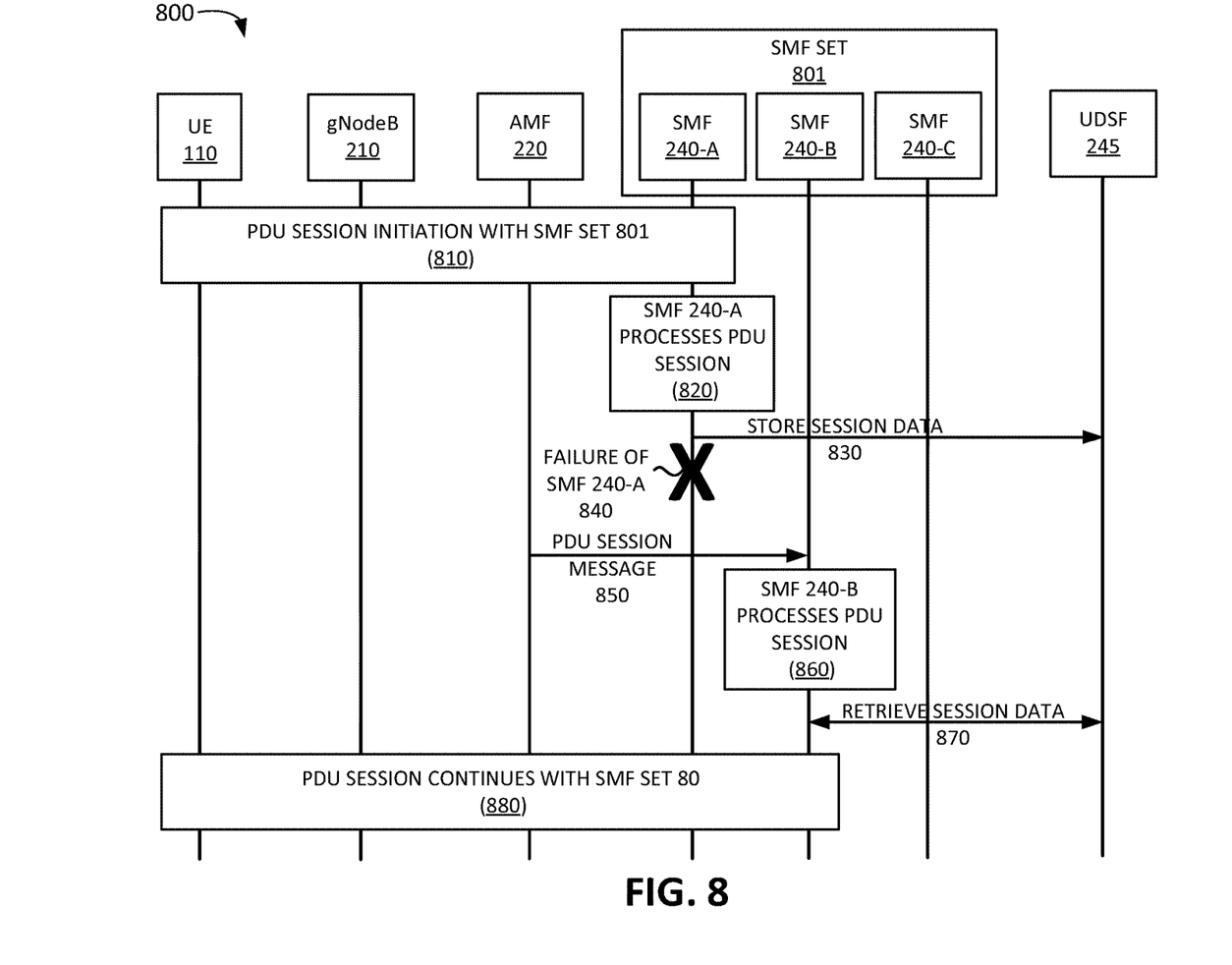
FIG. 8 illustrates an exemplary signal flow according to an implementation described herein.

FIG. 8 illustrates an exemplary signal flow 800 according to an implementation described herein. Signal flow 800 illustrates virtualized session management in a 5G core network. In FIG. 8, the SMEs make take the form of SMFs 240 and SME set 545 may take the form of SMF set 801). As shown, the core network includes SMF set 801. SMF set 801 may include SMF 240-A, SMF 240-B, and SMF 240-C. As shown in FIG. 8, signal flow 800 may include a PDU session initiation with SMF set 801 (block 810). For example, UE device 110 may send a session establishment request to AMF 220 via gNodeB 210 and AMF 220 may send a Create Session Management Context Request to SMF set 801. SME set manager 520 of SMF set 801 may select SMF 240-A for establishing the communication session (block 820). SMF 240-A may then communicate with a selected UPF 230 and PCF 254 to obtain information for creating the PDU session. SMF 240-A may then initiate an N4 Session Establishment Request with the selected UPF 230 and a communication path (e.g., a GTP tunnel, etc.) may be established between UE device 110 and UPF 230. SMF 240-A may store session data associated with the communication session in UDSF 245 (block 830). UDSF 245 may generate a new session record 600 for the communication session and store session data received from SMF 240-A in the generated session record 600.

At a later time, SMF 240-A may fail or become unavailable (item 840). SME set manager 520 of SMF set 801 may detect that SMF 240-A has failed and may designate SMF 240-A as inactive and forward messages to the other active SMF s 240-B and 240-C instead. Alternatively, SME set manager 520 of SMF set 801 may rotate through SMF 240-A, SMF 240-B, and SMF 240-C in a round-robin pattern to distribute messages associated with communication messages being handled by SMF set 801.

SME set manager 520 of SMF set 801 may receive a PDU session message from AMF 220 to update the session context (signal 850) and forward the message to SMF 240-B for processing (block 860). SMF 240-B may, in response retrieve session data for the communication session from UDSF 245 using the session ID for the communication session and update the session context based on the message received from AMF 220 (signal 870). The PDU session may then continue between UE device 110, UPF 230 (not shown in FIG. 8) and managed by SMF set 801, using the domain name associated with SMF 801 without, UE device 110, gNodeB 210, and AMF 220 detecting that the communication session was being managed by a different SMF 240 from SMF 240-A that established the communication session.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   maintaining, by a device, a plurality of session management entities (SMEs) for a core network associated with a radio access network (RAN), wherein an SME, of the plurality of SMEs, includes a virtualized network function configured to manage, in the core network, communication sessions for wireless user equipment (UE) devices;
   establishing, by a first SME of the plurality of SMEs, a communication session in the core network;
   storing, by the first SME, session data for the communication session in a communication session database accessible by each of the plurality of SMEs;
   receiving, by a second SME of the plurality of SMEs, a message associated with the communication session;
   retrieving, by the second SME, session data for the communication session from the communication session database, based on receiving the message; and
   processing, by the second SME, the message using the retrieved session data.

2. The method of claim 1, wherein the receiving, by the second SME of the plurality of SMEs, the message associated with the communication session, the retrieving, by the second SME, session data for the communication session from the communication session database, based on receiving the message, and the processing, by the second SME, the message using the retrieved session data, are performed without requiring session re-establishment for the communication session.

3. The method of claim 1, wherein a communication endpoint device associated with the communication session is kept agnostic with respect to which SME of the plurality of SMES is processing the message associated with the communication session.

4. The method of claim 1, wherein the communication session database is maintained by a network function that stores session data for communication sessions associated with another plurality of SMEs associated with the core network.

5. The method of claim 1, wherein particular ones of the plurality of SMEs are stateless with respect to communication session data.

6. The method of claim 1, further comprising:
selecting the second SME based on communication session loads associated with particular ones of the plurality of SMEs.

7. The method of claim 1, further comprising:
updating a configuration associated with a particular one of the plurality of SMEs without interrupting an active communication session associated with the particular one of the plurality of SMEs.

8. The method of claim 1, further comprising:
adding a new SME to the plurality of SMEs without interrupting active communication sessions associated with the plurality of SMEs.

9. The method of claim 1, wherein the communication session is established with the first SME by a communication endpoint device using a domain name associated with the plurality of SMEs.

10. The method of claim 1, wherein the first SME and the second SME each include a Fourth Generation (4G) Packet Data Network Gateway (PGW) control plane function (PGW-C).

11. The method of claim 1, wherein the first SME and the second SME each include a Fifth Generation (5G) Session Management Function (SMF).

12. A device comprising:
a processor configured to:
maintain a plurality of session management entities (SMEs) for a core network associated with a radio access network (RAN), wherein an SME, of the plurality of SMEs, includes a virtualized network function configured to manage, in the core network, communication sessions for wireless user equipment (UE) devices;
establish a communication session using a first SME, of the plurality of SMEs;
store session data for the communication session in a communication session database accessible by each of the plurality of SMEs;
receive, using a second SME of the plurality of SMEs, a message associated with the communication session;
retrieve, using the second SME, session data for the communication session from the communication session database, based on receiving the message; and
process, using the second SME, the message using the retrieved session data.

13. The device of claim 12, wherein the processor is configured to receive, using the second SME of the plurality of SMEs, the message associated with the communication session, retrieve, using the second SME, session data for the communication session from the communication session database, based on receiving the message, and process, using the second SME, the message using the retrieved session data without requiring session re-establishment for the communication session.

14. The device of claim 12, wherein the processor is further configured to:
select the second SME based on communication session loads associated with particular ones of the plurality of SMEs.

15. The device of claim 12, wherein the processor is further configured to:
update a configuration associated with a particular one of the plurality of SMEs without interrupting an active communication session associated with the particular one of the plurality of SMEs.

16. The device of claim 12, wherein the processor is further configured to:
add a new SME to the plurality of SMEs without interrupting active communication sessions associated with the plurality of SMEs.

17. The device of claim 12, wherein the communication session is established with the first SME by a communication endpoint device using a domain name associated with the plurality of SMEs.

18. The device of claim 12, wherein the first SME and the second SME each include a Fourth Generation (4G) Packet Data Network Gateway (PGW) control plane function (PGW-C).

19. The device of claim 12, wherein the first SME and the second SME each include a Fifth Generation (5G) Session Management Function (SMF).

20. A non-transitory computer-readable memory device storing instructions executable one a processor, the non-transitory computer-readable memory device comprising:
one or more instructions to maintain a plurality of session management entities (SMEs) for a core network associated with a radio access network (RAN), wherein an SME, of the plurality of SMEs, includes a virtualized network function configured to manage, in the core network, communication sessions for wireless user equipment (UE) devices;
one or more instructions to establish a communication session using a first SME, of the plurality of SMEs;
one or more instructions to store session data for the communication session in a communication session database accessible by each of the plurality of SMEs;
one or more instructions to receive, using a second SME of the plurality of SMEs, a message associated with the communication session;
one or more instructions to retrieve, using the second SME, session data for the communication session from the communication session database, based on receiving the message; and
one or more instructions to process, using the second SME, the message using the retrieved session data.

* * * * *